(12) United States Patent
Degler et al.

(10) Patent No.: US 8,047,345 B2
(45) Date of Patent: Nov. 1, 2011

(54) MULTI-PLATE CLUTCH AND HYDRODYNAMIC TORQUE CONVERTER DEVICE HAVING SAID MULTI-PLATE CLUTCH

(75) Inventors: Mario Degler, Baden-Baden (DE); Stephan Maienschein, Baden-Baden (DE); Jan Loxtermann, Baden-Baden (DE); Thorsten Krause, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 427 days.

(21) Appl. No.: 12/084,836

(22) PCT Filed: Oct. 12, 2006

(86) PCT No.: PCT/DE2006/001794
§ 371 (c)(1),
(2), (4) Date: May 9, 2008

(87) PCT Pub. No.: WO2007/054047
PCT Pub. Date: May 18, 2007

(65) Prior Publication Data
US 2009/0133978 A1    May 28, 2009

(30) Foreign Application Priority Data
Nov. 10, 2005 (DE) .......................... 10 2005 053 604

(51) Int. Cl.
*F16H 45/02* (2006.01)

(52) U.S. Cl. .................. 192/3.29; 192/70.17; 192/212; 192/213.2

(58) Field of Classification Search .................. None
See application file for complete search history.

(56) References Cited

U.S. PATENT DOCUMENTS

| | | | |
|---|---|---|---|
| 5,211,270 A * | 5/1993 | Tamura et al. | 192/3.29 |
| 6,123,178 A * | 9/2000 | Hinkel | 192/3.29 |
| 6,142,272 A * | 11/2000 | Meisner et al. | 192/3.29 |
| 6,267,213 B1 * | 7/2001 | Yamaguchi et al. | 192/3.29 |
| 6,571,929 B2 * | 6/2003 | Tomiyama et al. | 192/213.1 |
| 2004/0226794 A1 * | 11/2004 | Sasse et al. | 192/3.29 |

FOREIGN PATENT DOCUMENTS

| | | |
|---|---|---|
| DE | 4135631 A1 | 4/1992 |
| DE | 10352963 A1 | 5/2004 |
| JP | 07-004497 | 1/1995 |
| WO | WO00/03158 | 1/2000 |

* cited by examiner

*Primary Examiner* — David D Le
*Assistant Examiner* — Jacob S Scott
(74) *Attorney, Agent, or Firm* — Simpson & Simpson, PLLC

(57) ABSTRACT

A multi-plate clutch (2) having a first plate carrier (48) and second plate carrier (50) and one or more first plates (52) received by the first plate carrier and one or more second plates (54) received by the second plate carrier, a pressure element (58) which can especially be actuated hydraulically for generating an axial load on the clutch pack configured by the first and second plates and closing the multi-plate clutch, in which the pressure element configuring the second plate carrier and/or being connected to the second plate carrier in a rotationally fixed manner.

10 Claims, 15 Drawing Sheets

MULTI-PLATE CLUTCH AND HYDRODYNAMIC TORQUE CONVERTER DEVICE HAVING SAID MULTI-PLATE CLUTCH

CROSS-REFERENCE TO RELATED APPLICATIONS

This application is the National Stage of PCT International Application No. PCT/DE2006/001794, filed Oct. 12, 2006, which application published in German and is hereby incorporated by reference in its entirety, which application claims priority from German Patent Application No. DE 10 2005 053 604.2, filed Nov. 10, 2005 which is incorporated by reference in its entirety.

FIELD OF THE INVENTION

The invention relates to a multi-disk clutch and to a hydrodynamic torque converter device comprising such multi-disk clutch.

BACKGROUND OF THE INVENTION

Multi-disk clutches which comprise a first disk carrier and a second disk carrier, which is disposed rotatable about a rotation axis relative to the first disk carrier, are well-known. Thus, a plurality of first disks are non-rotatably received and axially moveable at the first disk carrier and plural second disks are non-rotatably received and axially moveable at the second disk carrier. Thus, the first and the second disks typically alternate in axial direction. Furthermore a multi-disk clutch is known, which is provided with a press component configured as a piston, which can be actuated hydraulically and which can load the disk packet in axial direction, which is formed from the first and second disks in order to lock the multi-disk clutch, so that a torque is transferable between the first disk carrier and the second disk carrier through the first and second disks. In the known embodiments, the piston is disposed axially moveable relative to the first disk carrier and also relative to the second disk carrier. A force opposite to the loading of the piston is imparted, in known embodiments, by a press plate and/or by a retaining ring, which is disposed on the side of the disk packet opposite to the piston and engages the first disk carrier in an axially fixated manner.

A hydrodynamic torque converter transmission device comprising a multi-disk clutch of the type is shown, e.g., in Figure of German Patent No. DE 103 52 963 A1. The hydrodynamic torque converter device shown therein comprises a converter torus formed by a pump shell, which is not illustrated, a stator shell, which is partially illustrated and a turbine shell, which is partially illustrated, as it is shown on right in the portion of the break line. The torque converter device furthermore comprises a torsion vibration damper, which comprises a first energy accumulator means, which comprises first energy accumulators. Furthermore, the torque converter device illustrated in the figure comprises a converter lock up clutch, which is the multi-disk clutch. The torque converter-transmission device furthermore comprises a converter housing, which is non-rotatably coupled to a shaft on the input side.

In the converter housing, the converter torus, the torsion vibration damper and the converter lock up clutch are received. The first disk carrier of the multi-disk clutch, which forms the converter lock up clutch, is integrally formed with the converter lock up clutch housing. The second disk carrier is non-rotatably coupled to an input component, which is, in particular, a flange, or which is formed by a plate of the torsion vibration damper, or it forms the input component of the torsion vibration damper. The piston of the converter lock up clutch, as discussed above, is disposed axially moveable relative to the first disk carrier and relative to the second disk carrier. When the converter lock up clutch is closed, a torque imparted through the converter housing transfers through the converter lock up clutch and the input component into the first energy accumulator means and through an output component, which is a flange, in particular, or which is formed by a plate of the first energy accumulator means and a hub, into a shaft on the output side. When the converter lock up clutch is completely open, torque transfers through the converter torus and is transferred from an output side extension of an outer turbine dish to a second input component of the torsion vibration damper, which is attached to the input component.

From there, the torque is transferred through the first energy accumulator means and the output component to the hub, and from there, to the shaft on the output side. In the configuration illustrated in FIG. 1 of DE 103 52 963 A1, the piston is disposed on the side of the disk packet formed by the disks of the multi-disk clutch, wherein the side is axially opposed to the first energy accumulator means. Since the piston is radially supported on the inside at this location, the disposition of the piston at this location is essentially required, otherwise the connection between the second disk carrier and the input component could not be created, or the second disk carrier could not be non-rotatably connected to the input component of the torsion vibration damper. Furthermore, in this configuration of a torque converter device, a pressure plate or a retaining ring is essentially required, which engages the first multi-disk carrier fixated in axial direction, and which is disposed on the side of disk packet facing away from the piston, in order to impart an opposite force against the piston force when locking the clutch, thus facilitating a friction locked connection of the disks.

BRIEF SUMMARY OF THE INVENTION

Broadly, the present invention is a multi-disk clutch, comprising a first disk carrier and a second disk carrier. Preferably, the first disk carrier is rotatable relative to the second disk carrier about a rotation axis, at least when the multi-disk clutch is open. The first disk carrier receives one or more first disks and the second disk carrier receives one or more second disks. In particular, an axially moveable press component is provided, like, e.g., a piston, which is supported axially moveable, by means of which axial force for partial or complete closing of the multi-disk clutch, can be imparted on the disk packet formed by the first and the second disks. The press component forms the second disk carrier and/or is non-rotatably connected to the second disk carrier.

Press component can, e.g., be a piston, which is supported axially moveable. It can be provided that such piston, which is supported axially moveable can be supported on the radial inside at a support portion, which can, e.g., be provided as a cylindrical sleeve. It is appreciated that, in principle, a press component can be provided, which is supported pivotably. In the case of a pivotably supported press component, it is provided, in an advantageous manner, that the pivotably supported press component is non-rotatably coupled to the second disk carrier, with reference to the rotation axis, about which the second disk carrier is rotatable relative to the first disk carrier.

The first and second disks are respectively configured annular in an advantageous embodiment. It is provided in particular that the first disks are non-rotatably received and axially moveable at the first disk carrier, with reference to the rotation axis. It is furthermore provided that the second disks are non-rotatably received and axially moveable at the second disk carrier. Such connections can be provided in various manners. For example, profiles of the spline connection type can be provided at the disk carriers and at the disks. In addition, first and second disks alternate in axial direction in a particularly preferred embodiment.

The second disk carrier is disposed radially within the first disk carrier in an advantageous manner. The first and/or the second disk carrier are preferably configured annular or sleeve-shaped. In a preferred embodiment, the first and the second disk carrier are disposed concentric. It can, e.g., be provided that the press component or the piston can be actuated hydraulically, pneumatically, or mechanically.

In particular, in the case of a hydraulically or pneumatically actuatable piston, it is preferably provided that a hydraulically or pneumatically loadable piston surface of the piston extends substantially transversal, e.g., perpendicular to the disk carriers.

It can be provided that the multi-disk clutch comprises an axial stop means, which is disposed on the side of the disk packet facing away from the piston, so that the disk packet is pressed against the respective stop means when the piston puts pressure onto the disk packet. Such a stop means can also be formed, e.g., by a pressure plate and/or a retaining ring. As described infra, it can, however, be provided that the multi-disk clutch itself does not comprise such a stop means and that such a stop means is formed instead by an adjacent component, like, e.g., a housing, at which the multi-disk clutch can be attached.

Furthermore, the present invention includes a hydrodynamic torque converter device according, which can, e.g., be integrated in a motor vehicle drive train, the hydrodynamic torque converter device comprising a torsion vibration damper and a converter torus formed by a pump shell, a turbine shell and a stator shell, and a converter lockup clutch. The converter lockup clutch is thus configured corresponding to a multi-disk clutch according to the invention. It is appreciated, that the means designated as "converter torus" in present disclosure is also designated as "hydrodynamic torque converter" in prior publications. On the other hand, the means designated as "hydrodynamic torque converter device" in the present disclosure, is partially designated in prior publications as "hydrodynamic torque converter". For reasons of clarity, the terms "hydrodynamic torque converter device", on the one hand, and "converter torus", on the other hand, are used in the present disclosure.

In an advantageous embodiment, the hydrodynamic torque converter device comprises a converter housing, in which the torsion vibration damper is at least partially received, and in which the converter torus and the converter lockup clutch are received. Thus, it can, e.g., be provided that an outer pump shell is a component of the converter housing. It is provided that the torsion vibration damper is rotatable about a rotation axis, which is identical to the rotation axis in an advantageous improvement, about which the first disk carrier is rotatable relative to the second disk carrier.

It is provided, in particular, that the torsion vibration damper comprises a first energy accumulator means, which comprises one or plural first energy accumulators, or which is formed by the energy accumulators. It can be provided that the first energy accumulator means comprises a plurality of such first energy accumulators, which are preferably with reference to the circumferential direction of the rotation axis of the torsion vibration damper distributed and/or spaced apart about the circumference. Such first energy accumulators can, e.g., be configured as springs or coil springs or arc springs. It can be provided that the piston of the converter lockup clutch forms the input component of the first energy accumulator means, or that it is non-rotatably connected to the input component. It can furthermore be provided that the torsion vibration damper comprises a second energy accumulator means in addition to such first energy accumulator means, wherein the energy accumulator means are connected in series, or wherein the first energy accumulator means is disposed in the torque transfer path between the converter lockup clutch and the second energy accumulator means, when the converter lockup clutch is closed. The first energy accumulator means can be a spring means. Furthermore, the second energy accumulator means can be a spring means.

It is provided, in particular, that the second energy accumulator means comprises one or plural second energy accumulators, or that it is formed by the second energy accumulators. It can be provided that the second energy accumulator means comprises a plurality of such second energy accumulators, which are disposed distributed and/or spaced apart about the circumference, preferably with reference to the circumferential direction of the rotation axis of the torsion vibration damper. The second energy accumulators can, e.g., be springs or coil springs or straight springs or compression springs. In a particularly preferred embodiment, the first energy accumulators are arc springs and the second energy accumulators are straight springs or straight compression springs.

Preferably, the first disk carrier of the multi-disk clutch is non-rotatably disposed and, preferably, axially fixated relative to the converter housing, or attached to the converter housing. Thus, it can be provided that the disk packet is disposed so that the converter housing, under a particularly axial pressure loading acting from the press component or piston upon the disk packet for partial or complete closing of the multi-disk clutch, supports the disk packet on the side of the disk packet facing the piston. It is thus provided, in particular, that an axial counterforce acting against the axial force imparted by the piston onto the disk packet is imparted by the housing, when completely or partially closing the multi-disk clutch, so that friction locking of the disks is facilitated. It can also be provided that slipping is thus facilitated, in particular, under partial closure.

It can be provided that the outer disk, which is disposed at the side of the disk packet facing the piston, directly contacts a wall of the converter housing, in particular, on the inside, when partially or completely closing the multi-disk clutch, possibly through a friction liner, which is, e.g., held at the converter housing or at the disk. It can be provided that the converter housing, e.g., comprises a nose-shaped protrusion, at which the disk packet is supported under the pressure loading. Also the press component or the piston of the multi-disk clutch can comprise such nose, by means of which the press component or the piston loads the disk packet or an exterior disk, when closing or partially closing the multi-disk clutch.

In a particularly preferred embodiment, the converter housing comprises a raised profile for axial support of the disk packet on its inside. Alternatively, or in a supplemental manner, it can be provided that the converter housing comprises a profile indentation on its inside for axial profile overlap of the second disk carrier when closing the multi-disk clutch.

It is the object of the invention to provide a multi-disk clutch, which is simple to manufacture and which functions reliably and which is well useable in various installation space conditions.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
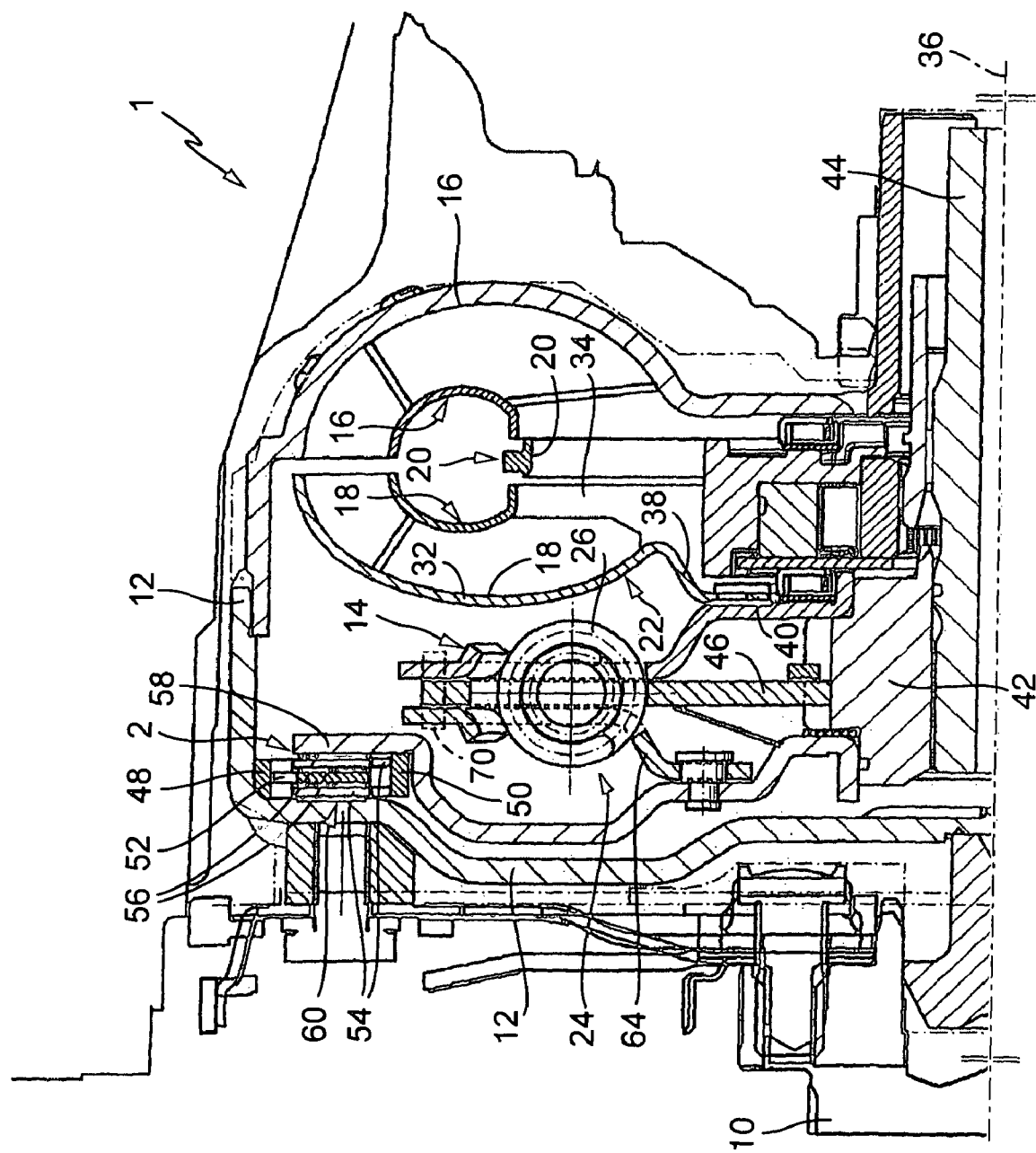
FIG. 1 is a partial, cross-sectional view of a first embodiment of the hydrodynamic torque converter device of the present invention.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Hydrodynamic torque converter device 1 comprises converter housing 12, non-rotatably connected to input shaft 10 like, e.g., a crank shaft or engine shaft of a combustion engine. Furthermore, hydrodynamic torque converter device 1 comprises converter lockup clutch 2, which is configured as multi-disk clutch, and torsion vibration damper 14 and converter torus 22, formed by pump shell 16, turbine shell 18 and stator shell 20. Converter torus 22, which is also sometimes designated as "torque converter" itself in prior publications, is configured in a known manner and comprises extension 38 of outer turbine dish 32, forming straight or annular portion 40, in the embodiments according to FIGS. 1-15, however, in an exemplary manner with reference to the radial direction of rotation axis 36 of hydrodynamic torque converter device 1 or of torsion vibration damper 14, wherein the extension adjoins the section of outer turbine dish 32 on the radial inside, wherein the section directly defines torus cavity 34.

Straight or annular section 40 can, e.g., be disposed in a plane perpendicular to rotation axis 36, as illustrated in the embodiments shown in the figures. Extension 38 is configured integral with outer turbine dish 32.

It is facilitated by extension 38, which is integrally formed with outer turbine dish 32, that connection means, like welds, bolts or the like, by which outer turbine dish 32 is coupled to components connecting to outer turbine dish 32 in the subsequent torque flow, can be disposed at locations, which are offset from the section of turbine dish 32, which directly adjoins turbine- or torus interior 34. This can be useful, e.g., to reduce the risk of thermal warping in the portion of the turbine blades, if welding is to be used for the connection. In addition, other connection means, like bolts, rivets or the like, can be applied in a simpler manner this way. In particular, the straight or flat section of extension 38 facilitates a simple non-rotatable connection of an adjoining component to outer turbine dish 32. It is appreciated, however, that a connection of components connecting to the turbine dish in the torque flow can also be performed in other manners, particularly known from the state of the art.

Torsion vibration damper 14 only comprises one energy accumulator means in the embodiments shown in FIGS. 1-7, which is also designated as first energy accumulator means 24 for simplification purposes, and comprises two energy accumulator means in the embodiments shown in FIGS. 8-15, thus, first energy accumulator means 24 and second energy accumulator means 28.

First energy accumulator means 24 comprises, in the embodiments shown in FIGS. 1-15 respectively, at least one first energy accumulator 26, but preferably a plurality of first energy accumulators 26, which are disposed distributed in a circumferential manner about rotation axis 36. In the embodiments shown in FIGS. 8-15, second energy accumulator means 28 comprises at least one, but preferably a plurality of, second energy accumulators 30, distributed in a circumferential manner about rotation axis 36.

First energy accumulator means 24 is thus connected to second energy accumulator means 28 in series. This is performed, in particular, so that first energy accumulator means 24 is disposed, and connected in series, between converter lockup clutch 2 and second energy accumulator means 28, at least when the converter lockup clutch is closed. For transferring a torque from the output side of first energy accumulator means 24 to the input side of second energy accumulator means 28, at least when converter lockup clutch 2 is closed, one or more intermediary component(s) configured as plate(s) are disposed between first energy accumulator means 24 and second energy accumulator means 28. In the embodiments which include a plurality of intermediary components or intermediary plates, respective connection means are provided between the intermediary components for non-rotatable coupling, like, e.g., bolts or welds or the like.

Furthermore, hub 42 is provided, which non-rotatably engages with output shaft 44, in particular, forming a transmission input shaft. Output component 46 is non-rotatably coupled to hub 42, wherein the output component is an output component of first energy accumulator means 24 in the embodiments shown in FIGS. 1-7, and wherein it is output component 46 of second energy accumulator means 28 in the embodiments shown in FIGS. 8-15. Output component 46 is preferably configured as a plate or as a flange. It can also be provided that instead of one output component 46, two or several output components 46 are provided, which are, e.g., also connected in parallel, wherein output components 46 are non-rotatably connected to hub 42 as illustrated, e.g., in FIGS. 11-15.

Multi-disk clutch 2, acting as a converter lockup clutch, comprises first disk carrier 48 and second disk carrier 50. First disk carrier 48 and second disk carrier 50 are respectively provided sleeve-shaped. Second disk carrier 50 is disposed radially within first disk carrier 48 with reference to the radial direction of rotation axis 36 and thus, in particular, concentric. One or more first disks 52 are received by first disk carrier 48 and one or more second disks 54 are received by second disk carrier 50. First disk 52 and second disk 54 are illustrated in FIGS. 1-5. Two first disks 52 and two second disks 54 are illustrated in FIGS. 6-15. It is appreciated, that the number of first disks 52 and second disks 54 can also be higher, in particular, significantly higher. In an axial direction, or in the direction of axis 36, first disks 52 and second disks 54 alternate. Between respectively adjacent disks, friction liners 56 are provided. It can be provided that first disks 52 and/or second disks 54 are provided with friction liners on both sides. It can also be provided that each disk 52 or 54 only comprises friction liner 56 on one side, wherein the arrangement of the friction liners is configured so that at least one respective friction liner 56 is formed between adjacent disks. The multi-disk clutch 2 comprises a piston 58. Piston 58 is a press component, by means of which an axial load can be imparted on disk packet 60, formed by first disks 52 and second disks 54, in order to facilitate a torque transfer between first disk carrier 48 and second disk carrier 50 through disks 52 and 54.

First disk carrier 48 is attached to converter housing 12. Second disk carrier 50 is formed at piston 58. This can be provided, in particular, so that second disk carrier 50, as shown in the figures, is non-rotatably mounted or fixated to piston 58. Second disk carrier 50 can, e.g., be welded to piston 58 or manufactured integrally therewith. However, this can also be provided so that piston 58 is non-rotatably connected to second disk carrier 50 with reference to rotation axis 36, and that it is disposed axially movable relative to second disk carrier 50. For this purpose it can, e.g., be provided, that second disk carrier 50 is provided with a spline connection, and also a matching spline connection engaging therewith is provided at piston 58. It can, e.g., be provided in such embodiment that second disk carrier 50 is disposed axially fixated. It can, e.g., be supported in such an embodiment, which is not shown, in an axially fixated manner at converter housing 12 by, for example, an axial thrust bearing.

While not shown in the figures, piston 58 can form a protrusion for loading disk packet 60, which is, e.g., configured as it is shown in German Patent No. DE 103 52 963 A1. Between the section of piston 58 provided for loading disk packet 60 and the outer disk of disk packet 60 facing the section, friction liner 56 is provided, which is either attached at the respective disk or at piston 58.

At the side of disk packet 60, facing piston 58, disk packet 60 can be supported at inside 80 of converter housing 12, or at a wall section of converter housing 12. In such an embodiment, a pressure plate or a retaining ring, which is required in the device shown in FIG. 1 of German Patent No. DE 103 52 963 A1, is redundant. Between the respective wall section of converter housing 12 and the disk of disk packet 60 adjacent to it, friction liner 56 is provided, which can either be attached to converter housing 12, or to the respective disk.

On inside 80 of converter housing 12, the respective wall of converter housing 12 comprises respective indentation or profile indentation 62 in an area proximate second disk carrier 50, in the embodiments shown in FIGS. 7-15, wherein the profile indentation facilitates the overlapping or partial or minimal overlapping of second disk carrier 50, when actuating multi-disk clutch 2. In the embodiments shown in FIGS. 1-15, piston 58 simultaneously forms input component 64 of first energy accumulator means 24 (see, FIGS. 6, 8, and 9-14), or piston 58 is non-rotatably connected to input component 64 through non-rotatable coupling, like, e.g., a rivet connection, a bolt connection (see, FIGS. 1-5) or spline connection or plug-in connection (see, FIG. 7).

Multi-disk clutch 2 can be disposed radially outside of first energy accumulator means 24 with reference to the radial direction of rotation axis 36 (see, FIGS. 1-5) or radially within first energy accumulator means 24 (see, FIGS. 8, 9, 11, 12, and 15). FIGS. 6, 7, 10, 13, and 14 show embodiments in which multi-disk clutch 2 is disposed mostly radially within first energy accumulator means 24, but where the multi-disk clutch, however, overlaps in radial direction with reference to the radial direction of axis 36 with first energy accumulator means 24.

It is provided according to the embodiments shown and described herein, that first energy accumulator means 24 is a spring means, or that second energy accumulator means 28 is a spring means. Accordingly, first energy accumulators 26 or second energy accumulators 30 are configured as springs and, in particular, as coil springs.

In the embodiments shown in FIGS. 1-15, it is provided, that piston 58 is radially supported at hub 42. It is furthermore provided in the embodiments that outer turbine dish 32 is radially supported at hub 42.

Figure 2:
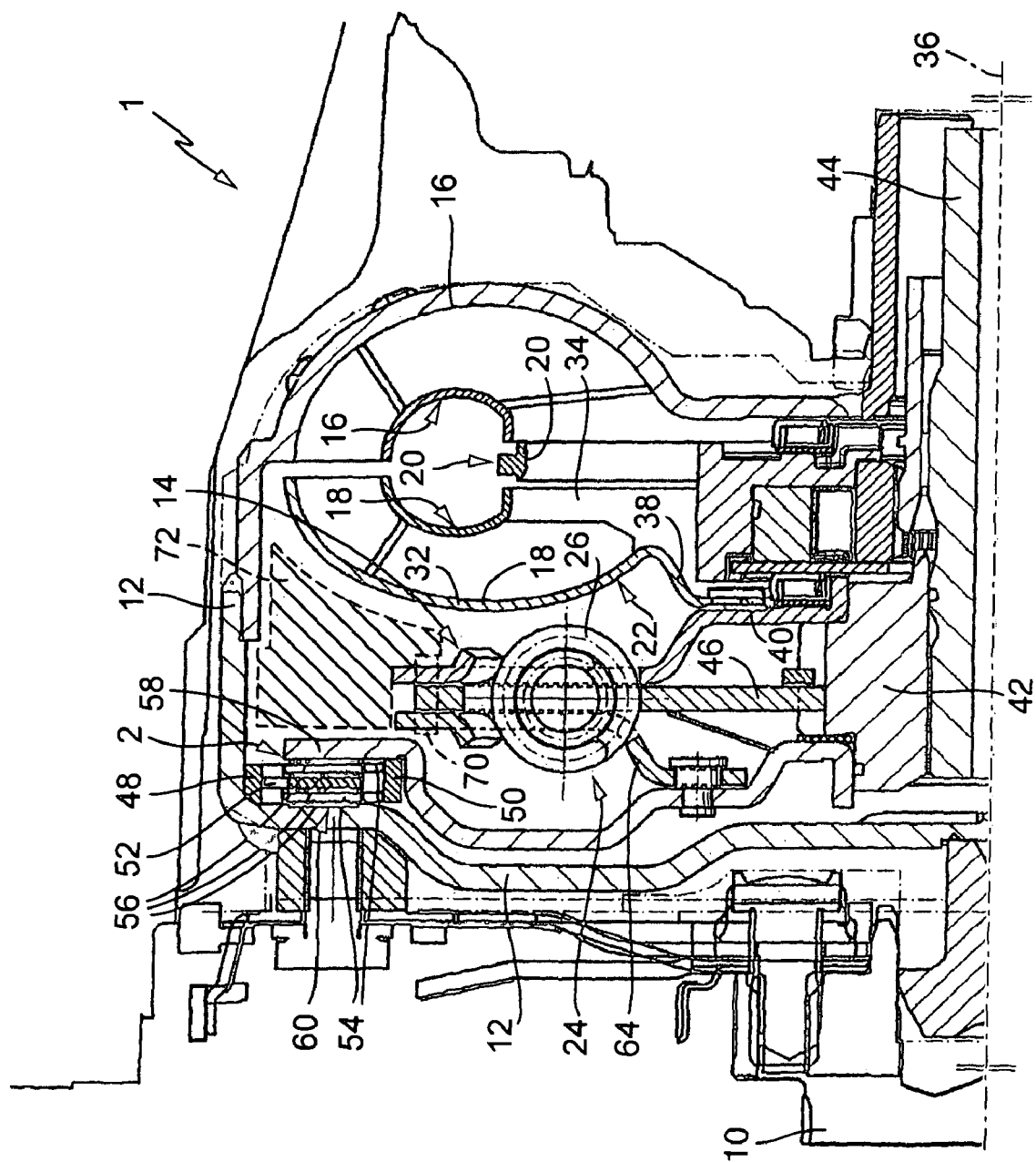
FIG. 2 is a partial, cross-sectional view of a second embodiment of the hydrodynamic torque converter device.
Figure 3:
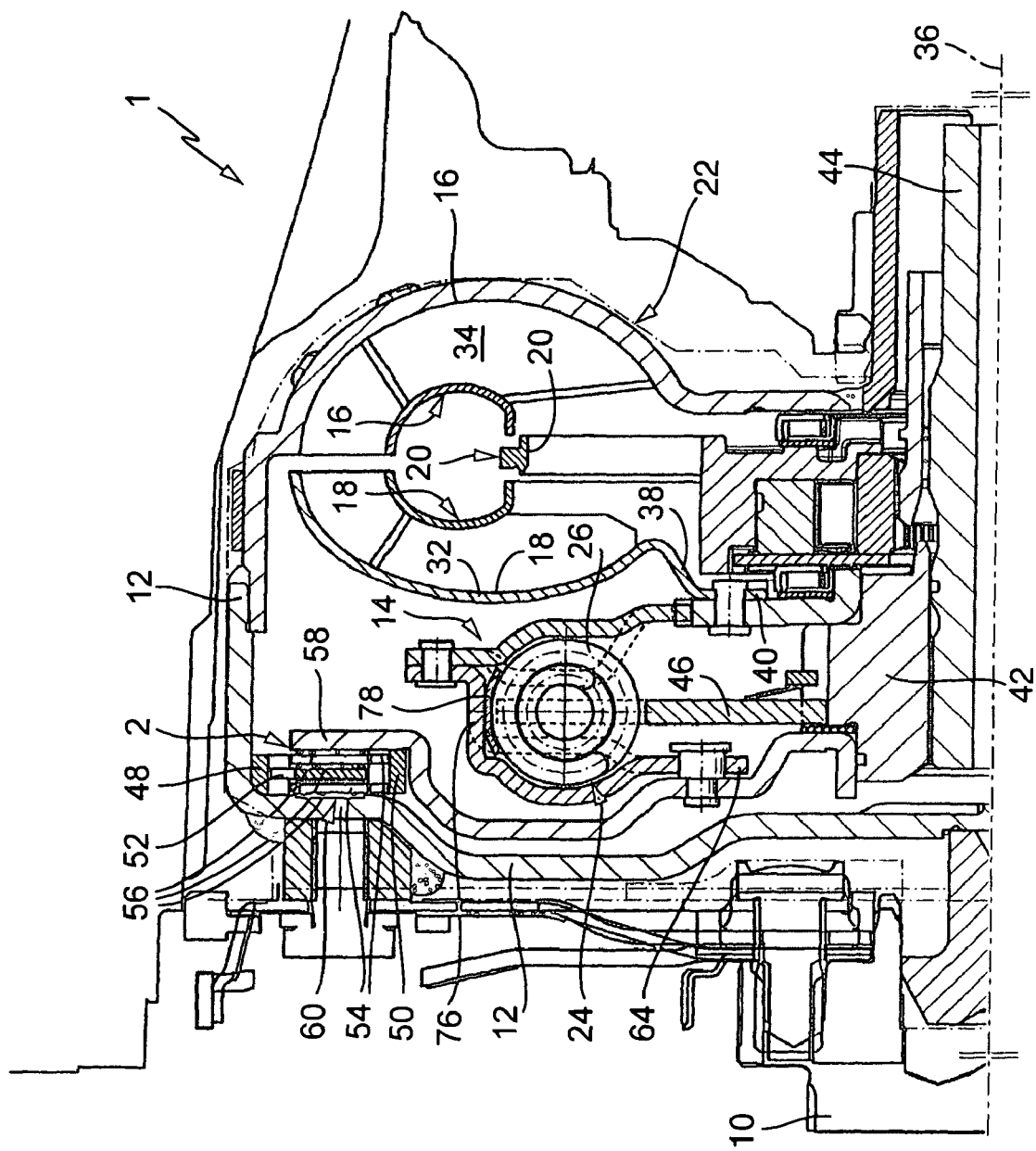
FIG. 3 is a partial, cross-sectional view of a third embodiment of the hydrodynamic torque converter device.
Figure 4:
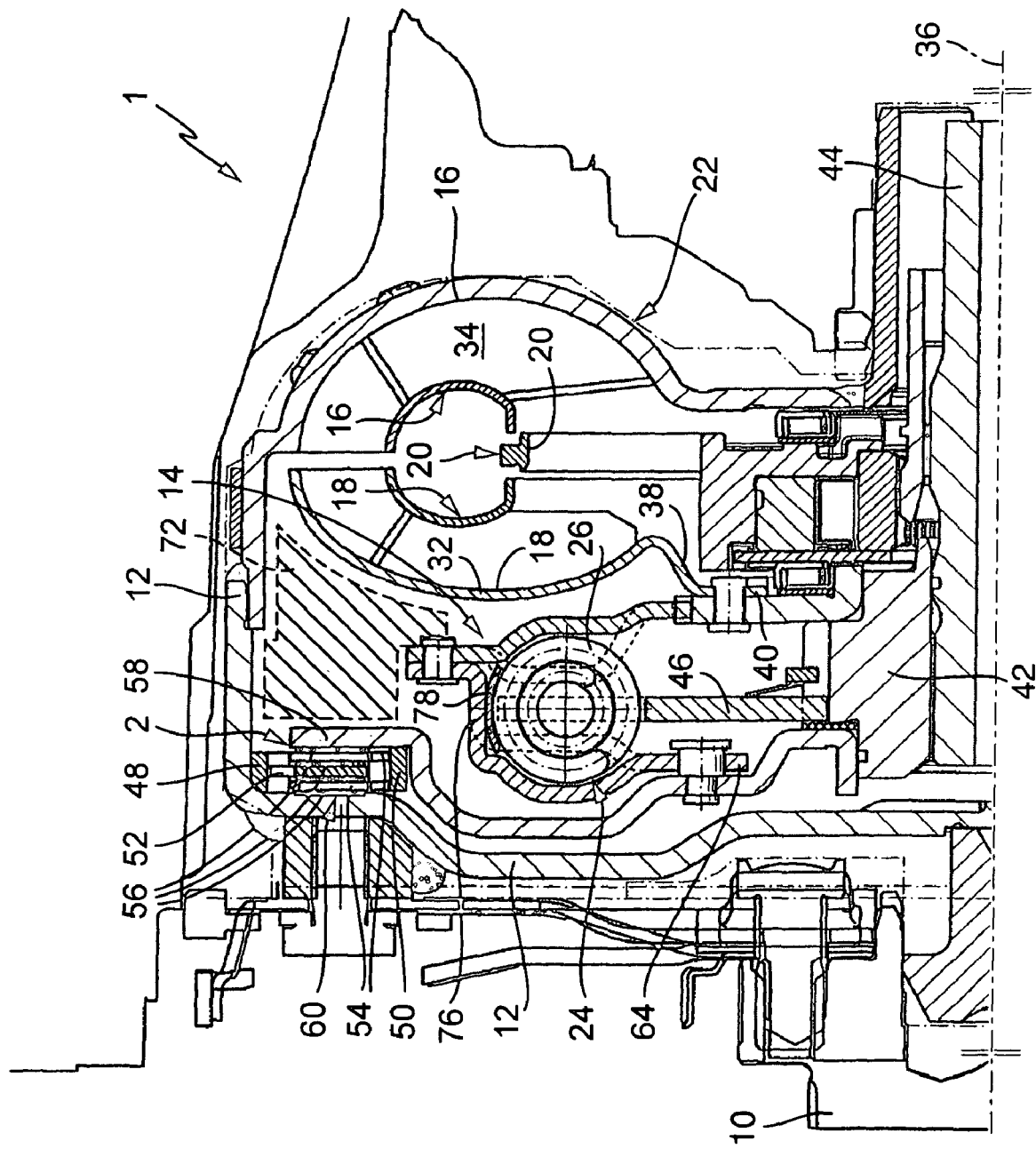
FIG. 4 is a partial, cross-sectional view of a fourth embodiment of the hydrodynamic torque converter device.
Figure 5:
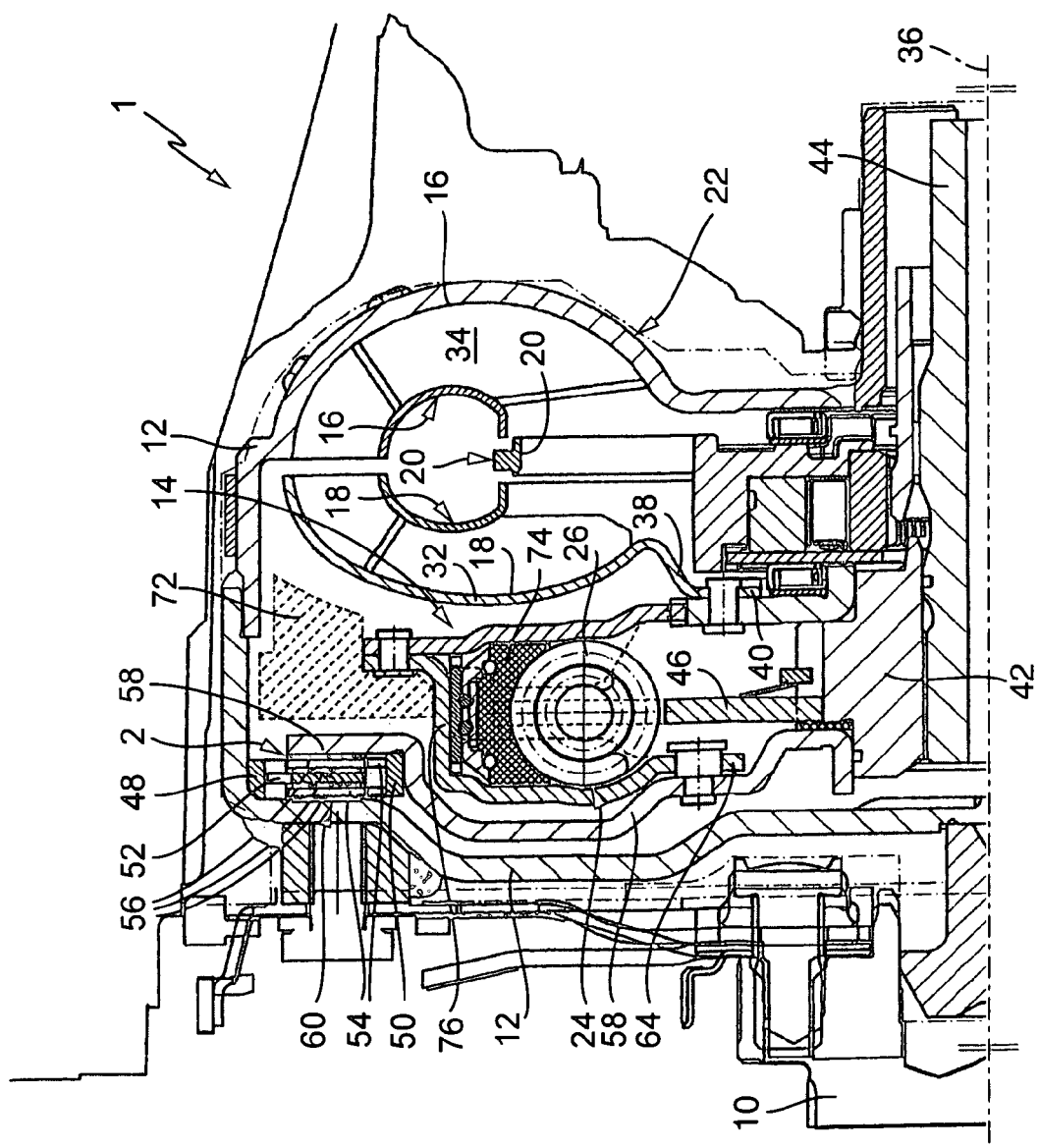
FIG. 5 is a partial, cross-sectional view of a fifth embodiment of the hydrodynamic torque converter device.

FIGS. 1 and 2 show a hydrodynamic torque converter device, which can also be designated as turbine torsion damper (TTD). In this embodiment, on the one hand, a torque can be transferred from the output side of converter lockup clutch 2, when converter lockup clutch 2 is closed, into the input side of first energy accumulator means 24, and, on the other hand, when converter lockup clutch 2 is open, a torque can be transferred from the output side of outer turbine dish 32 into first energy accumulator means 24. Thus, first energy accumulators 26 are configured as straight springs, or as straight compression springs.

The connection of the output side of torque converter lockup clutch 2 and of outer turbine dish 32 with the input side of first energy accumulator means 24 is configured in the embodiments shown in FIGS. 3-7, as described supra with reference to FIGS. 1 and 2.

Figure 6:
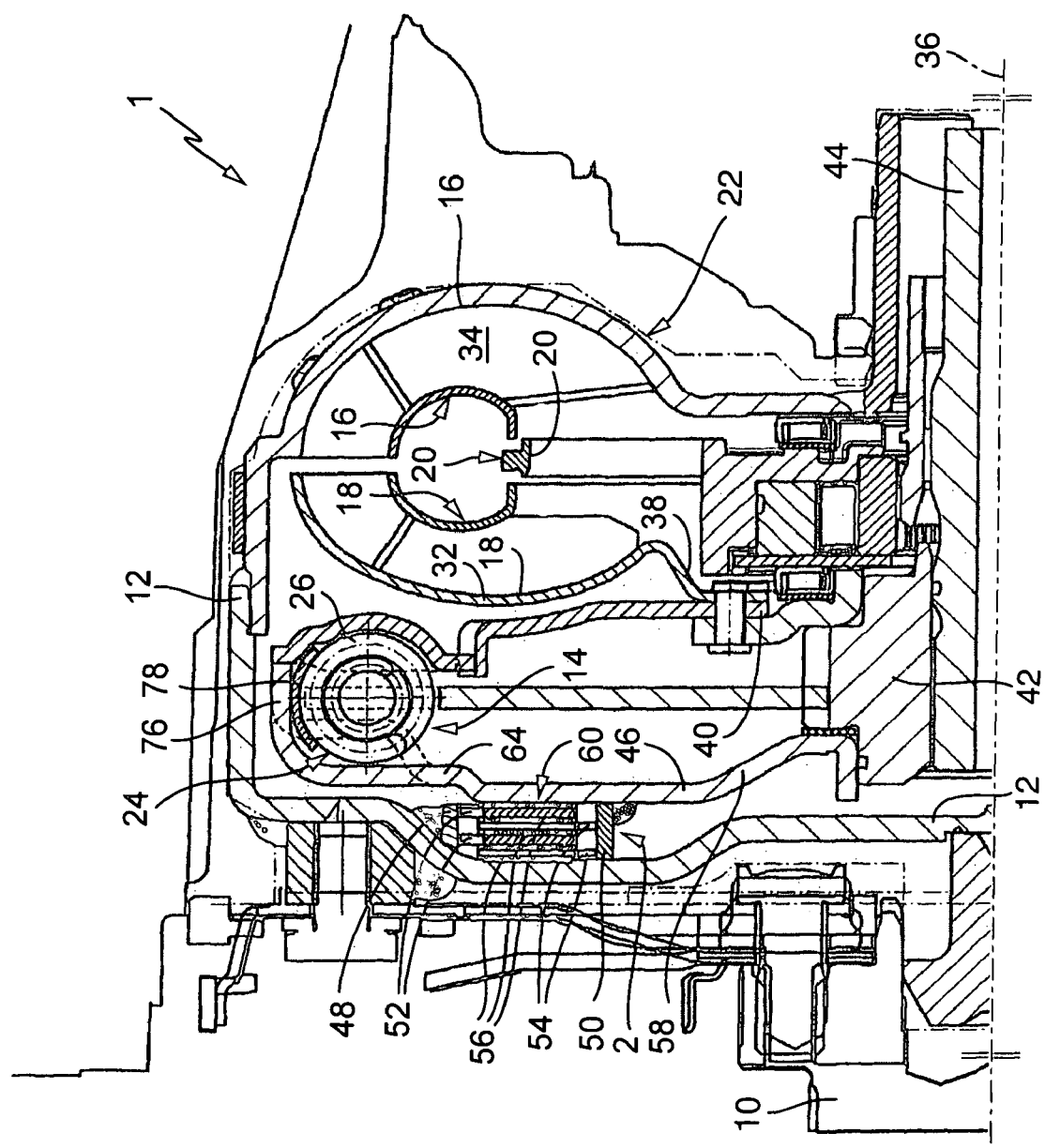
FIG. 6 is a partial, cross-sectional view of a sixth embodiment of the hydrodynamic torque converter device.
Figure 7:
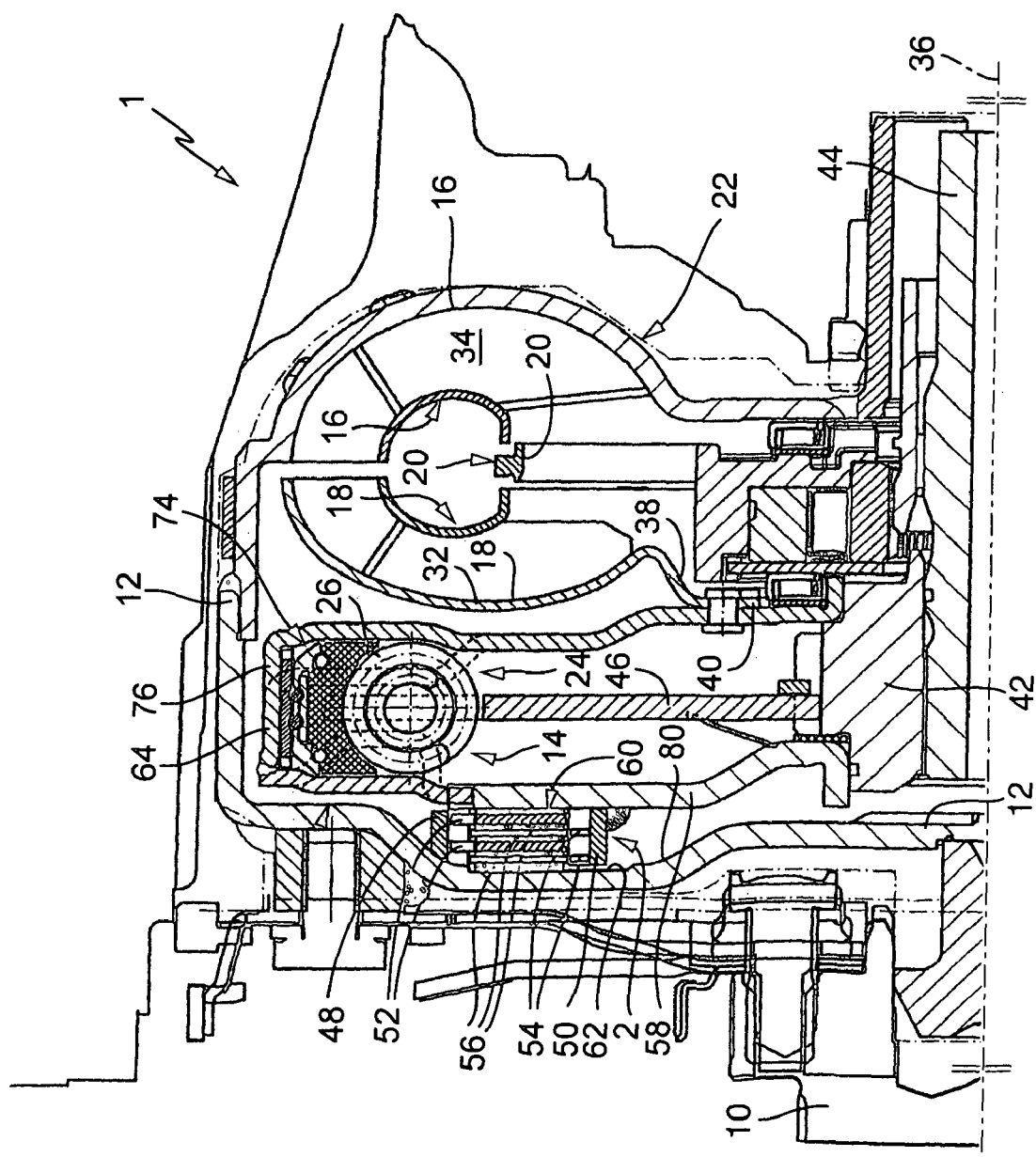
FIG. 7 is a partial, cross-sectional view of a seventh embodiment of the hydrodynamic torque converter device.

In the embodiments shown in FIGS. 6 and 7, however, first energy accumulators 26 are not configured as straight springs or straight compression springs, but rather as arc springs. This is also the case in the embodiments shown in FIGS. 3-5. In contrast the embodiments shown in FIGS. 6 and 7, it is provided in the embodiments shown in FIGS. 3-5 that first energy accumulator means 24 is disposed with reference to rotation axis 36 significantly further on the radial inside. With reference to the radial distance between central axis 36 and the section of the enveloping surface of converter housing 12, which is the furthest on the radial outside, the axes in the embodiments shown in FIGS. 3-5, or the central force effect lines of first springs 26 are disposed within the interior two thirds of the distance, while in the embodiments shown in FIGS. 6 and 7, the center axes or force effect lines are substantially positioned in the outer radial third. The embodiments shown in FIGS. 3-5 can also be designated as "small radius dampers", which comprise arc springs, and which are configured in turbine torsion damper configuration. The embodiments shown in FIGS. 6 and 7 can also be designated as turbine torsion dampers (TDD) with arc springs.

As illustrated in FIGS. 8-11, hydrodynamic torque converter devices I can also be designated as double turbine dampers (DTD). In these torque converter devices 1, at least one intermediary component 66 is disposed between first energy accumulator means 24 and second energy accumulator means 28, through which, when converter lockup clutch 2 is closed, a torque can be transferred from first energy accumulator means 24 to second energy accumulator means 28. Outer turbine dish 32 is non-rotatably connected to intermediary component 66, which is preferably configured as a plate, or a flange. It can also be the case that intermediary component 66 is formed by turbine dish 32, or by driver component 68, non-rotatably connected therewith, as illustrated, e.g., FIGS. 8-10. In the embodiments shown in FIGS. 8-11, when torque converter lockup clutch 2 is closed and under a respective load on the input side, e.g., by a combustion engine, a torque is transferred from converter housing 12 through converter lockup clutch 2, wherein the torque is then conducted through first energy accumulator means 24, and subsequently through intermediary component 66 and second energy accumulator means 28, and their output component 46 to hub 42. When converter lockup clutch 2 is open, the torque flows from converter housing 12 through converter torus 22 and from its outer turbine dish 32 through driver component 68 or intermediary component 66, and is subsequently transferred through second energy accumulator means 28 to its output component 46, from which it is transferred to hub 42. When converter lockup clutch 2 is completely open, first energy accumulator means 24 cannot be supported on the input side, and no torque flows through the energy accumulator means.

Figure 8:
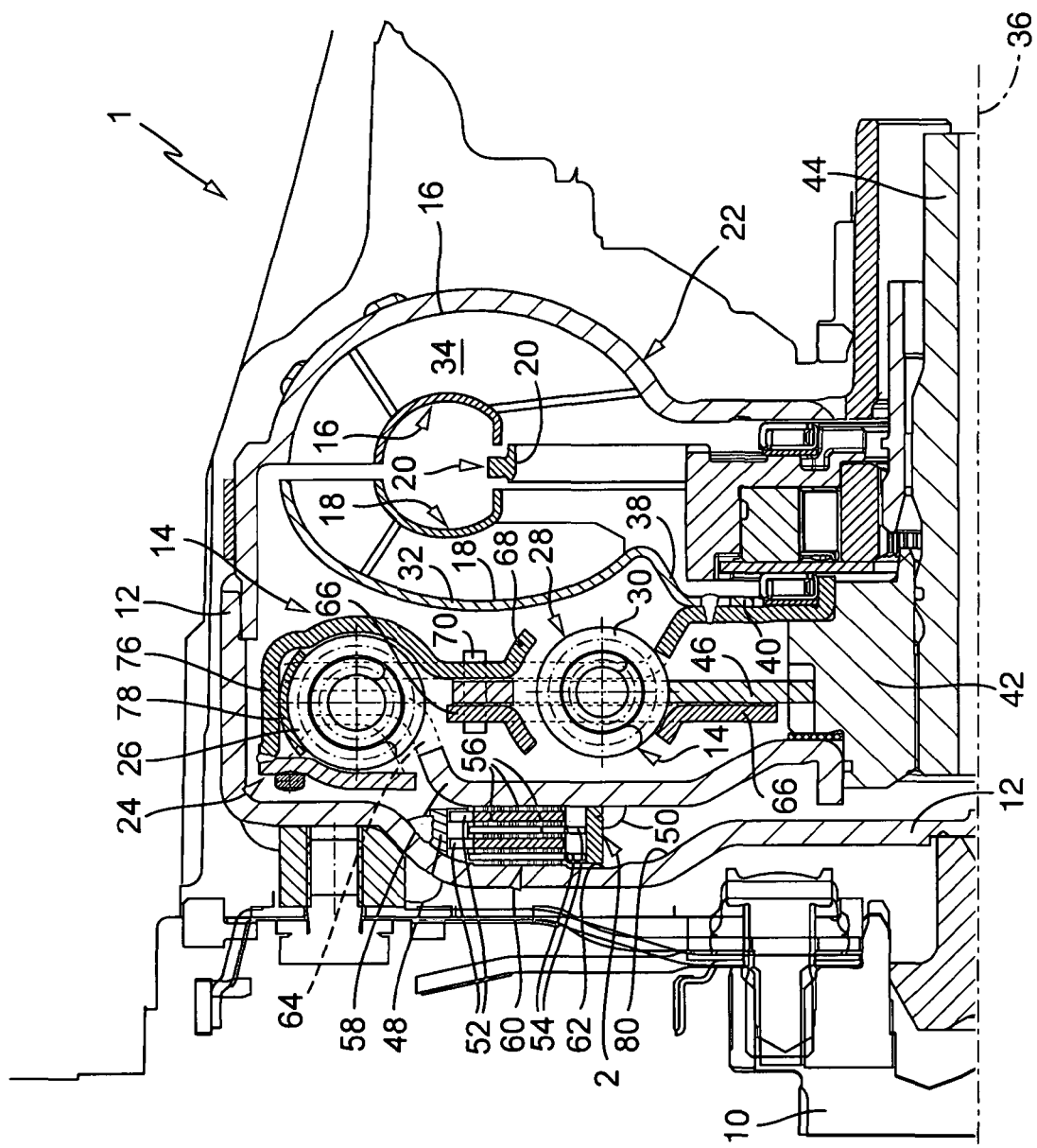
FIG. 8 is a partial, cross-sectional view of an eighth embodiment of the hydrodynamic torque converter device.
Figure 9:
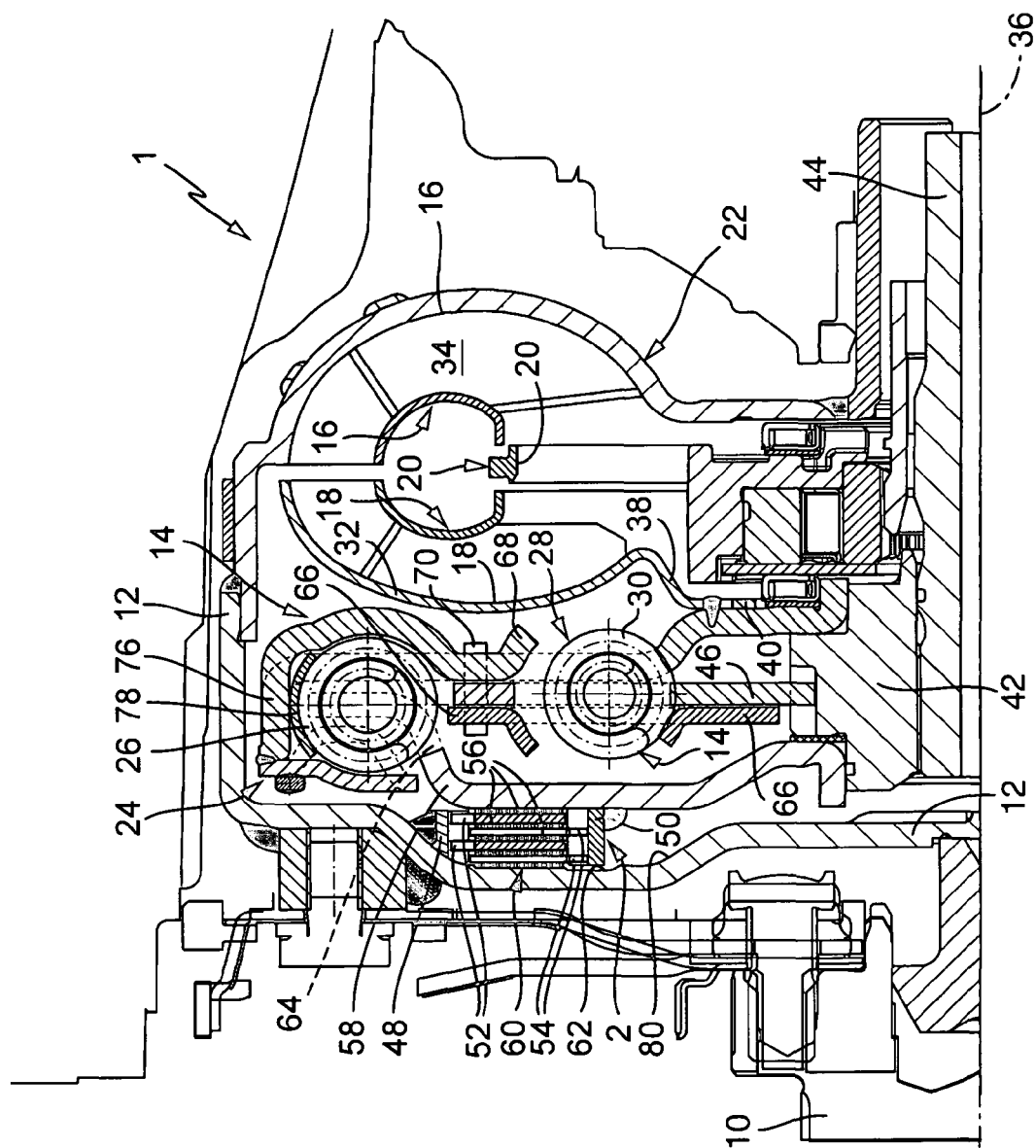
FIG. 9 is a partial, cross-sectional view of a ninth embodiment of the hydrodynamic torque converter device.
Figure 10:
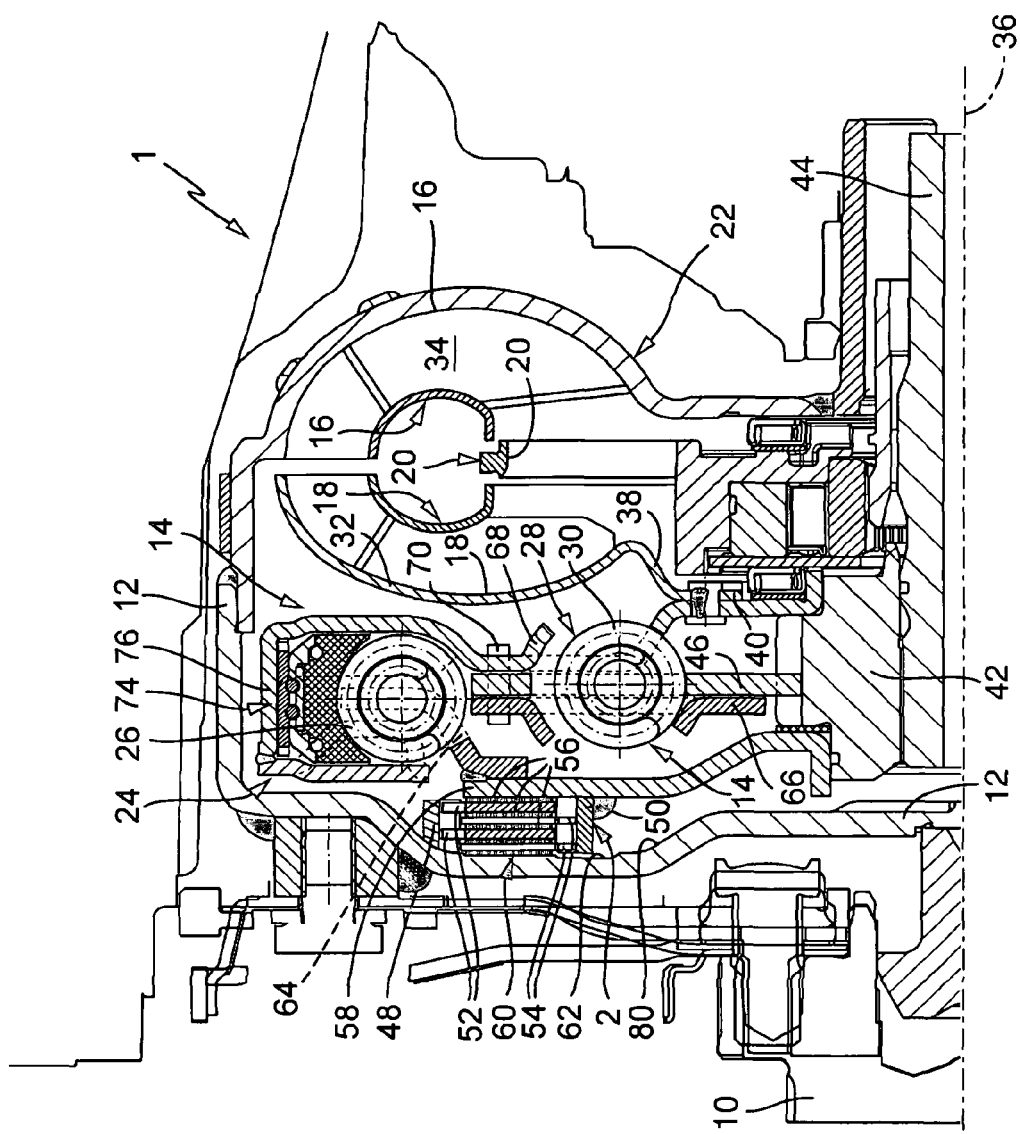
FIG. 10 is a partial, cross-sectional view of a tenth embodiment of the hydrodynamic torque converter device.
Figure 11:
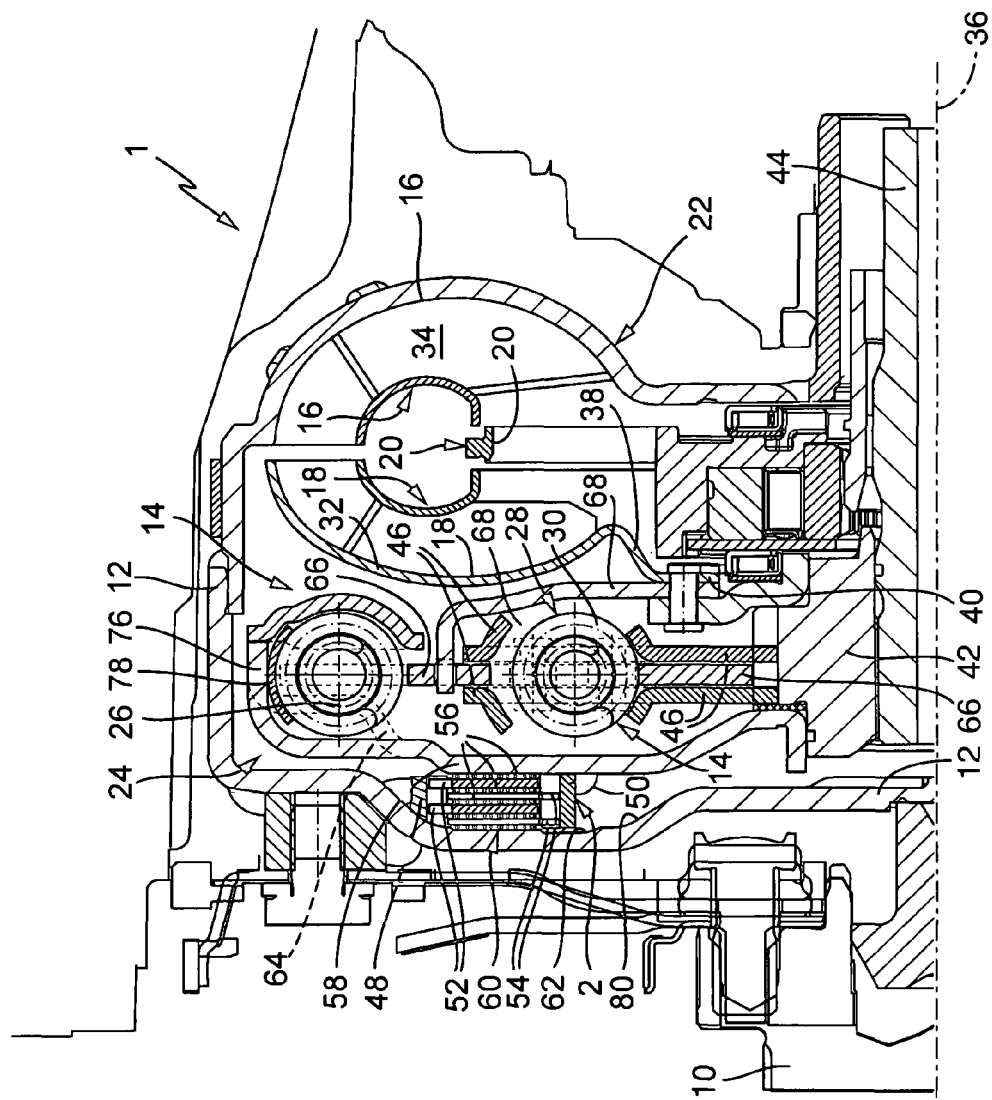
FIG. 11 is a partial, cross-sectional view of an eleventh embodiment of the hydrodynamic torque converter device.
Figure 12:
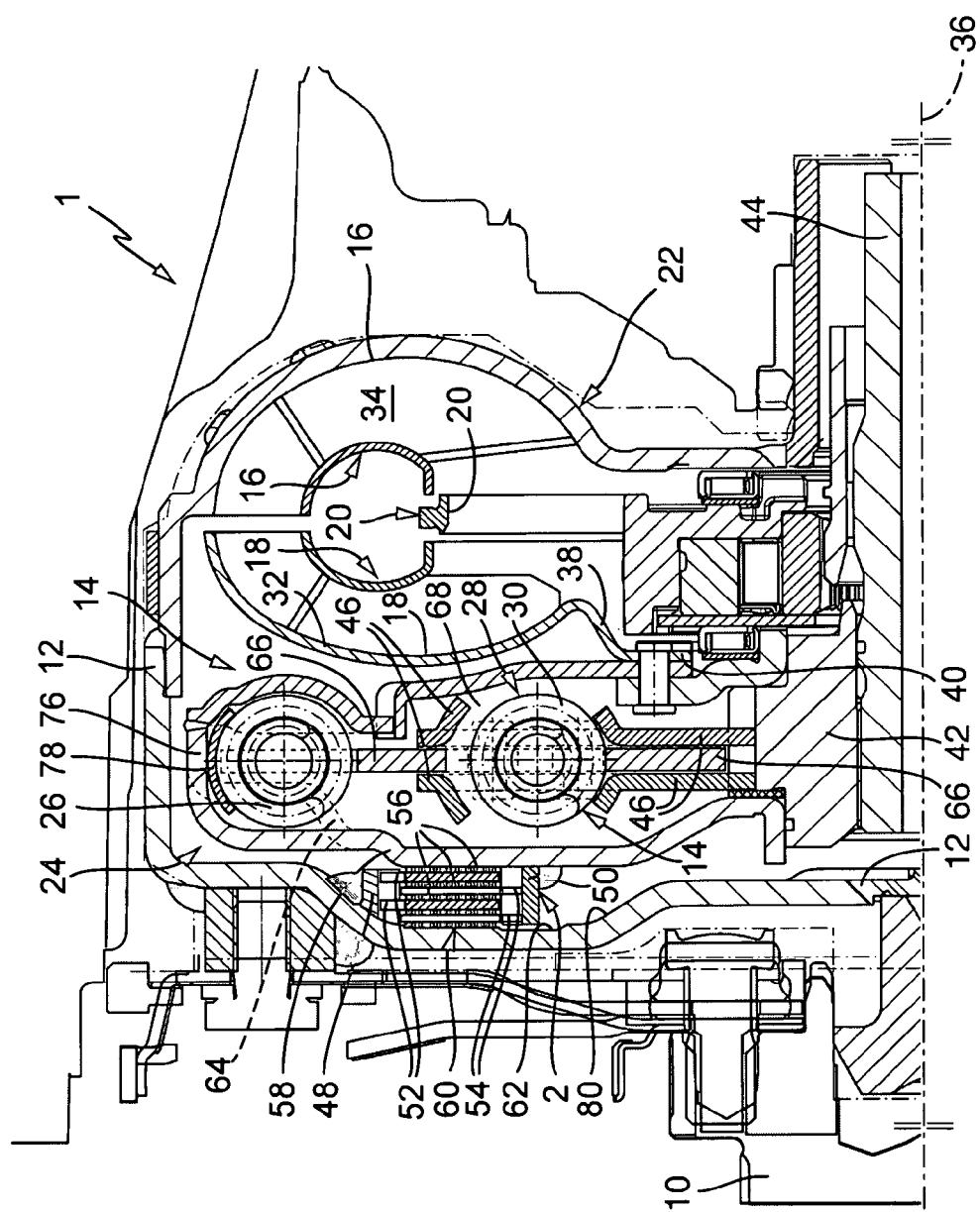
FIG. 12 is a partial, cross-sectional view of a twelfth embodiment of the hydrodynamic torque converter device.
Figure 13:
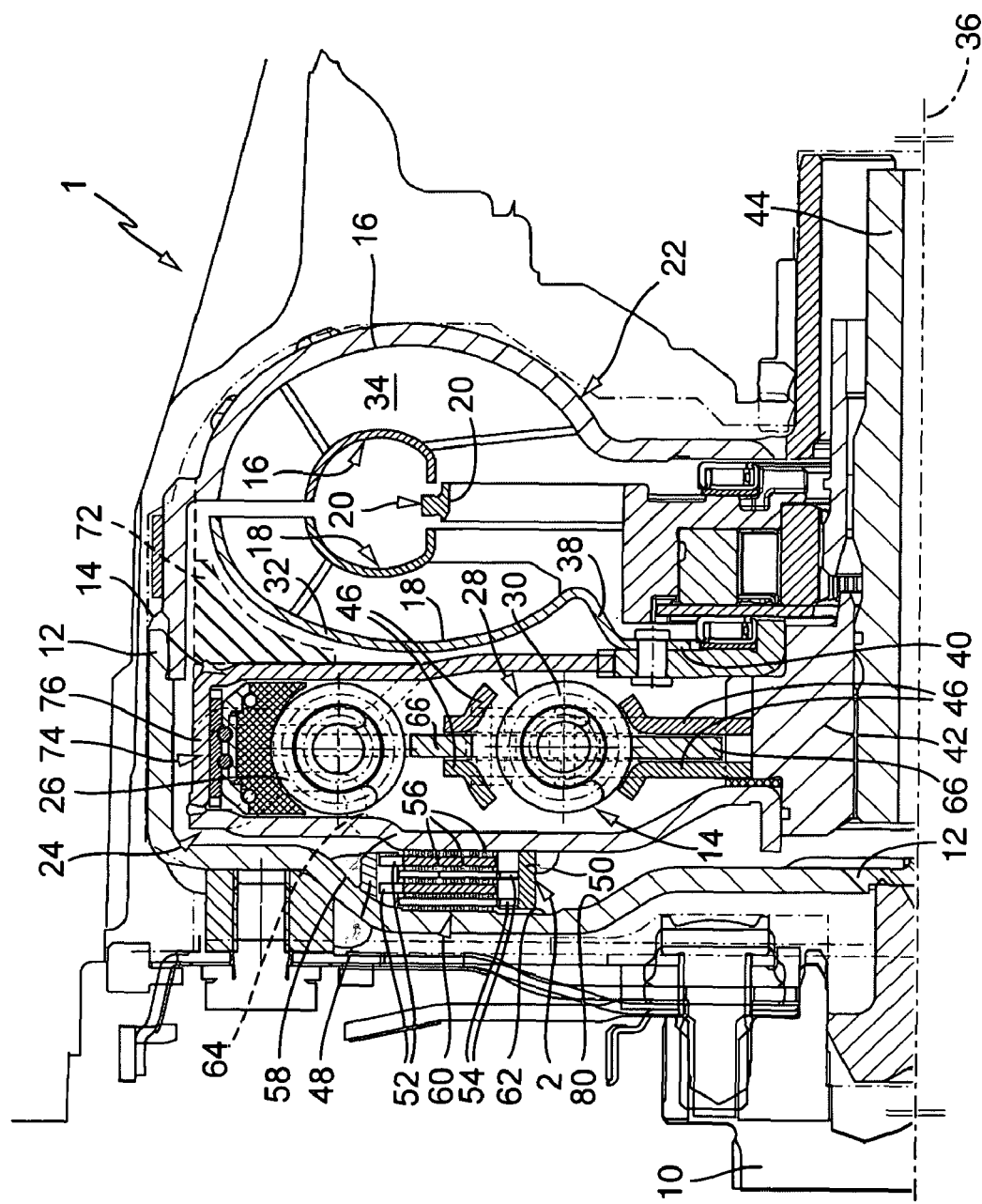
FIG. 13 is a partial, cross-sectional view of a thirteenth embodiment of the hydrodynamic torque converter device.
Figure 14:
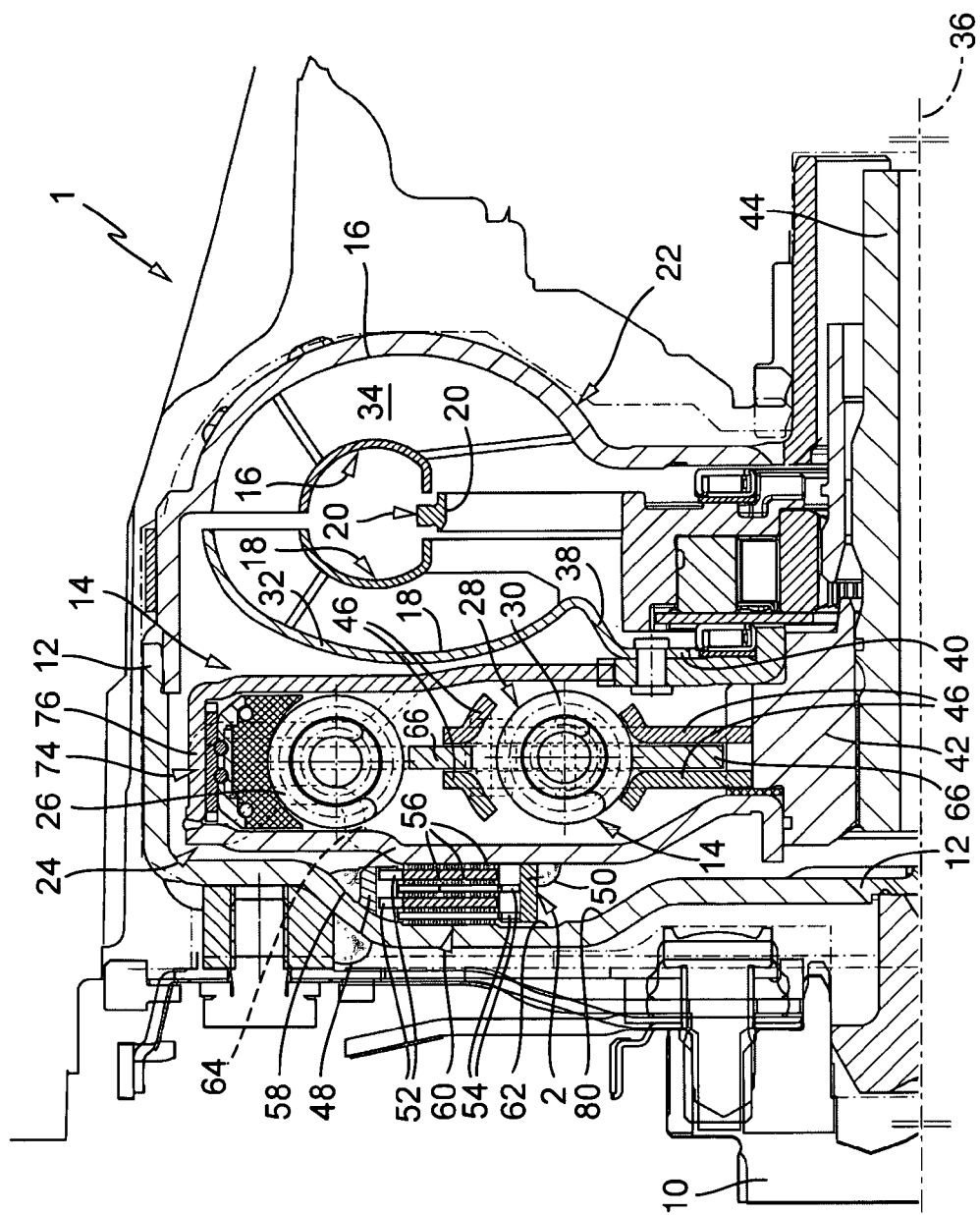
FIG. 14 is a partial, cross-sectional view of a fourteenth embodiment of the hydrodynamic torque converter device; and, FIG. 15 is a partial, cross-sectional view of a fifteenth embodiment of the hydrodynamic torque converter device.
Figure 15:
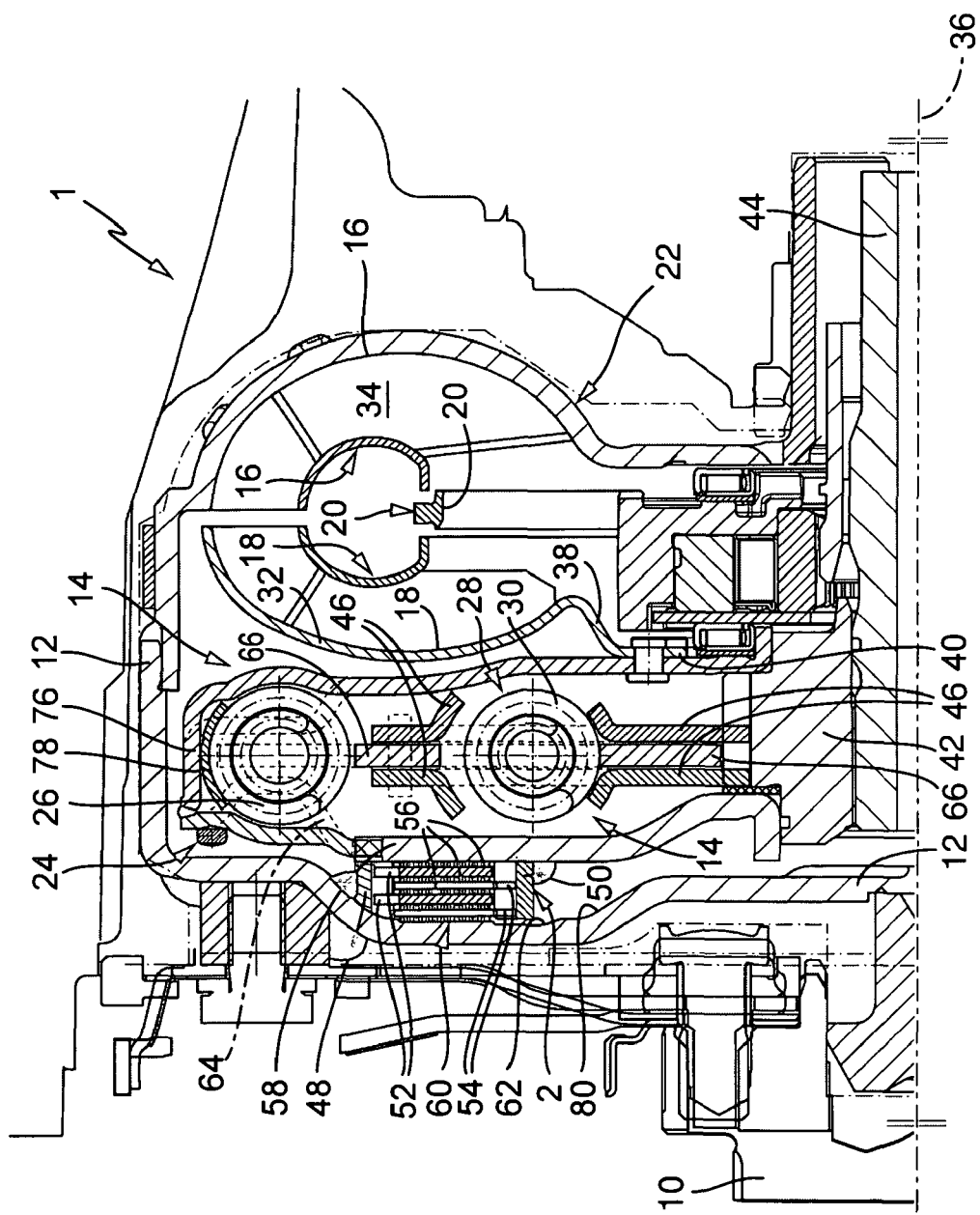

In the embodiments shown in FIGS. 8-10, a rotation angle limiter is provided, which is formed by a bolt, a pin, or rivet 70, wherein the rotation angle limiter avoids the blockage loading of the second energy accumulators, or of springs 30 of second energy accumulator means 28. This is configured so that the bolt or the pin or rivet 70 engages with intermediary component 66 and driver component 68 for their non-rotatable connection, and extends through a longitudinal groove, extending in output component 46 of second energy accumulator means 28, which is curved in particular according to the radius in this location with reference to axis 36.

A corresponding rotation angle limiter is also provided in the embodiments shown in FIGS. 1 and 2 for first energy accumulator means 24, wherein for simplification purposes only the reference numeral 70 is given in this location. Also, in other embodiments in which such rotation angle limiter is not shown explicitly, it can still be provided.

In the embodiment shown in FIG. 2, as opposed that which is shown in FIG. 1, input component 64 of first energy accumulator means 24 is connected to additional mass 72, or integrally configured with additional mass 72. Accordingly, the embodiment shown in FIG. 4 differs from the embodiment shown in FIG. 3 in the manner described supra, so that additional mass 72 is provided, which is also the case in the embodiment shown in FIG. 5.

In a preferred embodiment, piston 58 is configured as a plate and can, thus, also be designated as piston plate. It is furthermore provided in a preferred embodiment that the input components and the output components of first energy accumulator means 24, or of second energy accumulator means 28, are configured as plates. Also, intermediary component 66 or driver component 68 is configured as a plate in a preferred embodiment.

FIG. 9 shows an embodiment in which the plate thickness of driver component 68, which also forms intermediary component 66, is greater than the plate thickness of piston 58, or is greater than the plate thickness of the input component of first energy accumulator means 24. The same advantageously holds for the mass moment of inertia of the components. For instance, the mass moment of inertia of driver component 68, which also forms intermediary component 66, is greater than the mass moment of inertia of piston 58, or is greater than the mass moment of inertia of the input component of first energy accumulator means 24. This configuration can be used for improving the vibration characteristics of torsion vibration damper 14.

In the embodiments shown in FIGS. 5, 7, 10, 13, and 14, first energy accumulators 26 of first energy accumulator means 24 are supported at least under the effect of a centrifugal force by means 74, comprising plural roller elements, like balls or rollers, or by the roller elements of means 74, which can also be designated as a roller shoe, at energy accumulator housing 76, thus, a housing for the energy accumulators, and, thus, to the radial outside. Such support through roller elements facilitates a significant friction reduction. However, it can also be provided, that first energy accumulators 26, at least under the influence of centrifugal forces, are supported by slider shoes or one or more slider dishes 78, at one such energy accumulator housing 76, as it is shown, e.g., in FIGS. 3, 4, 6, 8, 9, 11, 12, and 15.

Energy accumulator housing 76, piston 58, input component 64 of first energy accumulator means 24, and outer turbine dish 32 respectively form a non-rotatable unit in the embodiments shown in FIGS. 3-7 and 11-15. The non-rotatable unit is rotatable about rotation axis 36. In the embodiments shown in FIGS. 8-10, energy accumulator housing 76 is non-rotatably connected to outer turbine dish 32, while piston 58 and input component 64 of first energy accumulator means 24 is pivotable about axis 36 and relative to energy accumulator housing 76 and outer turbine dish 32.

In the embodiments shown in FIGS. 3-15, first energy accumulators 26 are respective arc springs and, in particular, spiral springs. In the embodiments shown in FIGS. 8-15, second energy accumulators 30 of second energy accumulator means 28 are straight springs, straight compression springs, or coil springs.

In the embodiments shown in FIGS. 8-15, first energy accumulator means 24 is disposed radially outside of second energy accumulator means 28 with reference to the radial direction of rotation axis 36, wherein it is appreciated that the two energy accumulator means 24 and 28 can be disposed, e.g., also radially at one level, or axially next to one another.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

DESIGNATIONS 1 hydrodynamic torque converter device
2 converter lockup clutch or multi-disk clutch
10 input shaft like crank shaft or engine shaft of a combustion engine
12 converter housing
14 torsion vibration damper
16 pump shell
18 turbine shell
20 stator shell
22 converter torus
24 first energy accumulator means
26 first energy accumulator
28 second energy accumulator means
30 second energy accumulator
32 outer turbine dish
34 inner torus cavity
36 rotation axis
38 extension of 32
40 straight or annular section of 38
42 hub
44 output shaft or transmission input shaft
46 output shaft of 24 or 28
48 first disk carrier of 2
50 second disk carrier of 2
52 first disk
54 second disk
56 friction liner
58 piston of 2
60 disk packet
62 profile indentation in 12
64 input component of 24
66 intermediary component
68 driver component
70 bolt
72 additional mass
74 roller shoe
76 energy accumulator housing
78 slider shoes or slider dish
80 inside of 12

What is claimed is:

1. A hydrodynamic torque converter device, comprising:
a turbine;
a torsion vibration damper with an input component connected to the turbine such that rotation of the input component is fixed to rotation of the turbine; and,
a multi-disk clutch including:
a first disk carrier;
a second disk carrier;
at least one first disk arranged to be received by the first disk carrier;
at least one second disk arranged to be received by the second disk carrier; and,
a press component, wherein the at least one first disk and the at least one second disk form a disk packet, wherein the press component is hydraulically actuatable and arranged to generate an axial load onto the disk packet for closing the multi-disk clutch, wherein the press component is integrally formed with the second disk carrier or is non-rotatably connected to the second disk carrier, wherein the press component is integrally formed with the input component of the torsion vibration damper or is non-rotatably connected to the input component, and wherein an additional mass is non-rotatably connected to the input component.

2. The hydrodynamic torque converter device recited in claim 1, wherein the second disk carrier is disposed radially inside the first disk carrier.

3. The hydrodynamic torque converter device recited in claim 1, wherein the press component comprises a piston, the piston being supported axially movable.

4. The hydrodynamic torque converter device recited in claim 1, wherein the at least one first disk and the at least one second disk includes a friction liner.

5. The hydrodynamic torque converter device recited in claim 1 further comprising: a converter torus having a pump shell, a turbine shell and a stator shell; and, a converter lockup clutch comprising the multi-disk clutch.

6. The hydrodynamic torque converter device recited in claim 5, wherein the torsion vibration damper comprises a first energy accumulator means including at least one first energy accumulator.

7. The hydrodynamic torque converter device recited in claim 6, wherein the torsion vibration damper further comprises a second energy accumulator means including at least one second energy accumulator, wherein the first energy accumulator means is disposed in a torque path between the converter lockup clutch and the second energy accumulator means when the converter lockup clutch is closed.

8. The hydrodynamic torque converter device recited in claim 5 further comprising a converter housing, wherein the torsion vibration damper, the converter torus and the converter lockup clutch are at least partially received in the converter housing, wherein the first disk carrier is non-rotatably disposed relative to the converter housing, and wherein the disk packet is arranged such that the converter housing supports the disk packet under a pressure loading onto the disk packet from the press component for partial or complete closing of the multi-disk clutch on a side of the disk packet opposite to the piston.

9. The hydrodynamic torque converter device recited in claim 8, wherein the converter housing comprises an inside, the inside having a raised profile arranged for axial support of the disk packet and a profile indentation arranged for axial profile overlap of the second disk carrier, when closing the multi-disk clutch.

10. The hydrodynamic torque converter device recited in claim 6, wherein the torsion vibration damper comprises an output component coupled to an output shaft such that the rotation output component is fixed to rotation of the output shaft, wherein the turbine shell is independently rotatable, about an axis of rotation, with respect to the output shaft.

* * * * *